United States Patent [19]

Eustace

[11] 4,064,324
[45] Dec. 20, 1977

[54] METAL-HALOGEN ELECTROCHEMICAL CELL

[75] Inventor: Daniel J. Eustace, Chatham, N.J.

[73] Assignee: Exxon Research & Engineering Co., Linden, N.J.

[21] Appl. No.: 674,584

[22] Filed: Apr. 7, 1976

[51] Int. Cl.² ............................................. H01M 6/24
[52] U.S. Cl. ...................................... 429/101; 429/198; 429/199; 429/222; 429/229
[58] Field of Search ............... 429/101, 105, 198–201, 429/222, 229–231

[56] References Cited

U.S. PATENT DOCUMENTS

| | | | |
|---|---|---|---|
| 2,566,114 | 8/1951 | Block | 429/199 |
| 3,660,170 | 5/1972 | Rampel | 429/198 |
| 3,738,870 | 6/1973 | De Rossi | 429/198 |
| 3,811,945 | 5/1974 | De Rossi | 429/105 |
| 3,816,177 | 6/1974 | Walsh | 429/201 X |
| 3,944,430 | 3/1976 | Lee | 429/201 |
| 3,945,849 | 3/1976 | Hoffman | 429/201 |

Primary Examiner—C. F. Lefevour
Attorney, Agent, or Firm—Joseph J. Dvorak

[57] ABSTRACT

An improved metal-halogen electrochemical cell particularly a zinc bromide cell, contains a water soluble organo substituted amino acid salt in the electrolyte which forms a substantially water insoluble liquid complex with cathodic halogen thereby reducing self-discharge of the cell.

10 Claims, 1 Drawing Figure

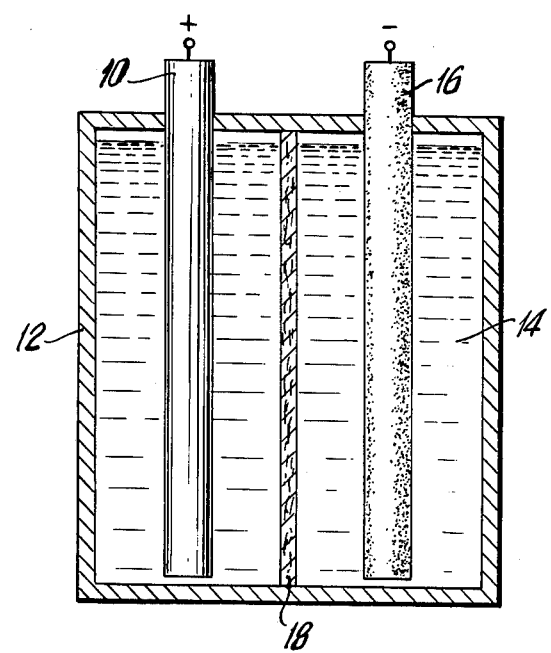

METAL-HALOGEN ELECTROCHEMICAL CELL

BACKGROUND OF THE INVENTION

1. Field of the Invention

This invention relates to metal-halogen cells having an aqueous solution of a metal halide as the electrolyte. In particular, the present invention relates to improved cells and batteries employing a zinc or cadmium anode, a bromine cathode and an aqueous metal bromide electrolyte in which the metal of the metal bromide is the same as the metal of the anode.

2. The Prior Art

Cells for the production of electricity having two electrodes, one with a high positive oxidizing potential, the anode, and one with a strong negative or reducing potential, and cathode, having long been known. Typical of such type cells is metal halogen cells in which the anode material most commonly employed is zinc, and the most commonly employed cathodic halogen is bromine. Among the advantages of said cells is their extremely high theoretical high energy density. For example, a zinc-bromine cell has a theoretical energy density of 200Wh/lb (i.e., watt hours per pound) and an electrical potential of about 1.85 volts per cell.

In such a cell the surface of the metal anode, for example, zinc, oxidizes thereby undergoing a positive increase in valence. As a result thereof, zinc atoms are converted to zinc ions which enter the electrolyte according to the equation:

$$Zn \rightarrow Zn^{++} + 2e$$

The chemical reaction occurring at the cathode is expressed by the following equation:

$$Br_2 + 2e \rightarrow 2Br^-$$

Thus, the overall chemical reaction can be written as follows:

$$Zn + Br_2 \rightleftarrows Zn^{++} + 2Br^-$$

The arrow to the right indicates the direction of the chemical reaction occurring during cell discharge and the arrow to the left indicates the chemical reaction occurring during charging of the cell.

The electrochemical cells of the foregoing type are known to suffer from a number of disadvantages. Most of these disadvantages are associated with side reactions which may occur in such cells. For example, during the charging process free bromine is produced in the cell. This free bromine is available for a chemical reaction with the metal anode thereby resulting in an auto-discharge of the cell. Additionally, there is the tendency for hydrogen gas to be generated when considerable amounts of free bromine are present in the aqueous phase. It is believed that hydrogen is generated according to the following chemical reactions:

$$Br_2 + H_2O \rightarrow HBr + HBrO$$

$$2HBr + Zn \rightarrow ZnBr_2 + H_2$$

The art is replete with efforts on the part of many inventors to overcome the above-mentioned disadvantages. In U.S. Pat. No. 2,566,114, for example, the use of tetraethyl and tetramethyl ammonium bromides for combining with bromine generated during charging of the cell is disclosed. The tetramethyl ammonium salt is added to the powdered carbon surrounding the cathode.

In U.S. Pat. No. 3,738,870 the use of a solid mixture of alkyl ammonium perchlorate and conductive materials such as graphite to form solid addition products with halogen released during charging of such cells is disclosed.

In U.S. Pat. No. 3,811,945 the use of certain alkyl ammonium perchlorates, diamine bromides and diamine perchlorates, which are capable of forming solid addition products with cathodic bromine and which are substantially insoluble in water is disclosed.

In contrast to those references which suggest forming solid addition products with bromine, U.S. Pat. No. 3,408,232, discloses the use of an organic solvent for elemental bromine in such aqueous zinc-halogen batteries; U.S. Pat. No. 3,816,177 discloses the use of a quaternary ammonium halide and a depolarizer in the electrolyte. The depolarizer is an organic complexing solvent which dissolves in water and is non-reactive toward the halogen in the cell and forms a water insoluble complex in the presence of quaternary ammonium halides.

These references and many others show a continuing effort on the part of many inventors to overcome some of the disadvantages associated with metal halogen cells of the type referred to herein. Unfortunately, the methods proposed for overcoming the aforementioned disadvantages have not adequately overcome the problems encountered in such systems. There is, consequently, a need for more effective methods for preventing loss of cell capacity in aqueous metal-halogen cells.

SUMMARY OF THE INVENTION

It has now been discovered that elemental bromine is sufficiently separated from an aqueous solution in a form of a liquid complex by chemical reaction of the molecular bromine with certain quaternary ammonium salts, especially quaternary ammonium chloride and bromide salts of N-organo substituted alpha amino acids. Indeed, the ammonium salts of the present invention can be considered generally to be derivatives of glycine. Specifically, the nitrogen substituted amino acid derivatives contemplated by the present invention are selected from the group of compounds represented by the following formulas:

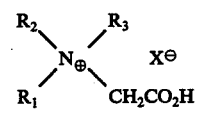

I

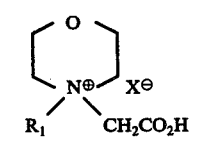

II

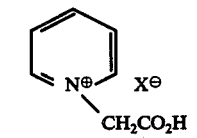

III

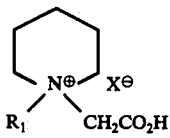

wherein $X^{31}$ is a halide anion selected from the group consisting of chloride and bromide anions, $R_1$, $R_2$, and $R_3$ are alkyl and haloaklyl groups of from 1 to 8 carbon atoms.

Thus, in one embodiment of the present invention there is provided an electrochemical cell comprising a metal anode selected from zinc and cadmium, a bromine cathode, an aqueous metal bromide solution as electrolyte, the metal of the metal bromide being the same as the metal of the anode and the aqueous metal bromide solution containing a water soluble acid salt of a N-organo substituted amino acid which substituted amino acid combines with bromine to form a substantially water immiscible liquid complex.

These and other embodiments of the present invention will become more apparent upon a reading of the detailed description in conjunction with the drawing.

DESCRIPTION OF THE DRAWING

The sole FIGURE is a cross-sectional view of the cell in accordance with the present invention.

DETAILED DESCRIPTION OF THE INVENTION

Turning now to the FIGURE, there is shown one embodiment of the cell of the present invention. As illustrated in the FIGURE, an electrochemical cell of the present invention comprises a metal anode 10 disposed in a container 12 containing aqueous electrolyte 14.

The metal anode in accordance with the present invention is selected from zinc and cadmium. It should be noted, however, that it is not absolutely essential that the metal anode be formed solely of zinc or cadmium. Indeed, inert wire mesh or various forms of porous carbon materials upon which zinc or cadmium may be plated can serve very well in forming zinc or cadmium electrodes.

Spaced apart from the anode 10 is a chemically inert electrode 16. Inert electrode 16 is disposed within container 12 so as to be in contact with aqueous electrolyte 14 and the bromine-active cathodic material which material will be described hereinafter in greater detail. Turning first, however to electrode 16 it should be noted that a wide range of inert materials can be used for fabricating electrode 16, such as various forms of electrically conductive and noncorrosive materials including porous carbon, graphite and carbon felt. Indeed, the inert electrode 16 preferably is formed of a highly porous material which will absorb the cathodically active halogen complex. A suitable chemically inert, porous, electrically conductive material for forming the inert electrode 16 for the practice of the present invention is a carbon felt, such as UCAR grade, VDF carbon felt sold by Union Carbide Corporation, Carbon Products Division, 270 Park Ave., New York, N. Y.

The electrolyte of the cell of the present invention is an aqueous metal bromide solution in which the metal of the metal bromide corresponds to the metal of the anode. Thus, when zinc is the anode-active material then the metal bromide used is zinc bromide. Similarly, when cadmium is the active metal anode material then the electrolyte is an aqueous cadmium bromide solution.

The concentration of the metal bromide in the aqueous electrolyte in not critical; and a wide range of concentrations may be employed depending, for example, on the desired energy density of the cell. Typically, the molarity of the aqueous metal bromide solution will be in the range of about 2.5 to 3.5 molar, although as little as 0.5 moles/liter and as much as 6.0 moles/liter and higher can be used.

Optionally and preferably, other salts such as zinc sulfate may be added to the electrolyte to improve electrolyte conductivity and/or zinc metal plating characteristics. The effects of such additives are well known and form no part of the present invention.

As is shown in the FIGURE, the cell is provided with a separator 18, which separator prevents internal shorting that can typically occur as a result of dendrite growth. The separator 18 can be any porous material typically used to prevent physical contact with two electrodes such as fiberglass mats, fiberglass felt, microporous polymeric materials such as porous polyethylene and the like.

As is indicated hereinbefore, the cathode-active material of the present invention is bromine. The cathodically active material is present as a substantially water immiscible liquid halogen complex of certain quaternary ammonium salts of alpha amino acids. The types of N-organo substituted amino acids suitable in the practice of the present invention are those which have the following characteristics. First, the N-organo-substituted amino acid must be water soluble; and, second, it must be one which is capable of combining with bromine. Third, the resultant bromine complex must be a substantially water immiscible liquid at temperature in the range of from about 10° to about 60° C. and at least between 23° to 30° C. The ammonium salts presently contemplated by the present invention can be represented by the following structural formulas:

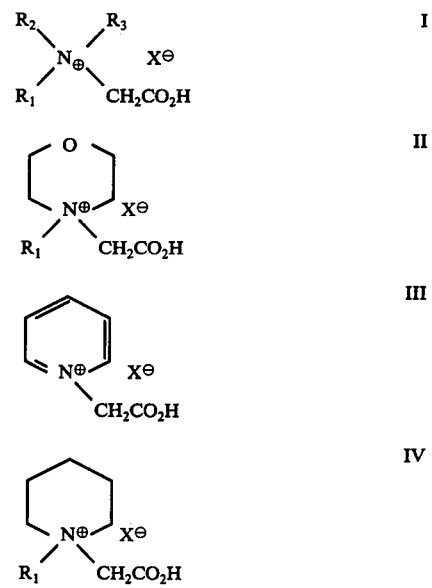

wherein X— is an anion selected from the group consisting of chloride and bromide and wherein $R_1$, $R_2$, and $R_3$ are alkyl and haloalkyl groups having from 1 to 8 carbon atoms. Representative of the foregoing type of compounds are listed in Table I.

TABLE I

| Structural Formula | Chemical Formula | Partition Coefficient 2M $ZnBr_2$ | Partition Coefficient 4M $ZnBr_2$ |
|---|---|---|---|
| $CH_3$—$N^+$(CH_3)—CH—CH_2CO_2H, Br⁻ | $C_5H_{12}N_2Br$ | 1.6 | 1.2 |
| pyridinium-$N^+$—$CH_2CO_2H$, Br⁻ | $C_7H_8O_2NBr$ | 2.1 | 1.6 |
| morpholinium O—$N^+$—CH—$CH_2CO_2H$, Br⁻ | $C_7H_{14}O_3NBr$ | 3.3 | 2.6 |
| piperidinium—$N^+$(CH_3)—$CH_2CO_2H$, Br⁻ | $C_8H_{16}O_2NBr$ | 8.1 | 6.7 |

Also listed in the table are the partition coefficients for those representative materials. The partition coefficient is a measure of halogen complexing ability of these organo substituted amino acids. The technique for determining the partition coefficient will be explained hereinafter.

In any event, the preferred organo-substituted amino acid salts of the present invention are the piperidinium salts described herein.

The substituted amino acid salts used in the cell of the present invention is dissolved in the electrolyte solution 14 where it is available to complex the cathodic halogen upon charging of the cell. The amount of amino acid salt used, for example the bromide, will depend upon the amount of halide present in the electrolyte and the depth of charge of the cell, for example. Generally, however, the ratio of amino acid salt to metal halide used will be from about 1:4 to about 1:1. Typically, the ratio of the amino acid salt to metal halide will be 1:3.

The halogen complexing amino acid salts can be prepared by standard techniques. Indeed, the method of preparation of such materials forms no part of the present invention. Generally, these materials can be prepared by reacting an appropriate tertiary amino with a haloalkyl carboxylic acid such as bromo acetic acid. Thus, for example, trimethylamine can be reacted with bromoacetic acid to produce betaine hydrobromide. Similarly, tertiary amines such as pyridine can be reacted with bromo acetic acid to yield the corresponding salt, 1-carboxy methyl pyridinium bromide.

As will be appreciated, when the cell is charged, halogen is produced at the surface of the inert cathode 16 where it will complex with the halogen complexing amino acid present in the electrolyte to form a liquid insoluble halogen complex. Thus, with a zinc bromide electrolyte bromine is generated at electrode 16 during charging of the cell. The bromine so generated is complexed by the amino acid.

In the cell shown in the FIGURE, the inert electrode 16 is a porous material which is capable of storing the liquid halogen complex within the pores of the electrode structure.

It will be appreciated that one of the advantages in the use of N-organic substituted amino acid chlorides and bromides in accordance with the present invention is that the halogen complex which results from the combination of the bromine and the complexing amino acid derivative is a liquid at normal cell operating temperature and it is fluid. It does not require additional volumes of materials such as aprotic solvents or organic materials to keep the complex in a liquid form, thereby increasing the volume of the liquid that must be handled in order to complex the bromine.

The following examples illustrate the modes of practice in the present invention.

EXAMPLE 1

The amino acid halides, e.g., the betaine hydrobromides described hereinabove and utilized in the following tests were prepared by standard techniques.

The partition coefficients for these materials, representative examples of which are given in Table I, were determined by dissolving 3.28 m moles of the acid salt in each of 5.0 cm³ of 2M and 4M $ZnBr_2$ solutions respectively. Thus, 9.84 m moles of $Br_2$ was added to each solution with stirring for 30 minutes at 25° C. Next the solutions were allowed to settle thereby resulting in two phases, the lower oily phase being a bromine rich phase. This lower phase was analyzed for bromine by standard analytical techniques. The partition coefficient represents the ratio of bromine in the lower phase to the bromine in the upper phase calculated as follows:

$$\text{partition coefficient} = \frac{\text{m moles Br}_2 \text{ in lower phase}}{(9.84 - \text{m moles Br}_2 \text{ in lower phase})}$$

EXAMPLE 2

A cell was constructed in which one electrode, the substrate for zinc deposition, was formed from carbon powder and a plastic binder which were mixed and compressed on a tantalum screen current collector. The counter electrode was formed from a mixture of charcoal and carbon black in a tetrafluoroethylene binder impressed on a tantalum screen current collector. A commercially available silica filled porous polyethylene sheet material was used as the battery separator. The area of each electrode was 20 cm². The cell was filled with 6.0 cm³ of an aqueous solution containing 3M $ZnBr_2$, 0.94 M N-1-carboxymethyl, N-methyl piperidinium bromide and 0.2M $ZnSO_4$. The cell was charged and discharged under the conditions given in Table II below. Included in the Table II are cell performance data.

TABLE II

| Cycle No. | $I^c$, A | $Q^c$, A·hr | %U | $I^d$, A | $Q^d$, A·hr | E, % |
|---|---|---|---|---|---|---|
| 2 | 0.2 | 0.56 | 58 | 0.1 | 0.45 | 80 |
| 4 | 0.2 | 0.71 | 74 | 0.1 | 0.53 | 75 |
| 5 | 0.2 | 0.66 | 69 | 0.4 | 0.50 | 76 |
| 6* | 0.2 | 0.56 | 58 | 0.1 | 0.27 | 48 |
| 7 | 0.2 | 0.61 | 64 | 0.1 | 0.44 | 72 |

*The cell was allowed to stand at open circuit potential between charge and discharge for 15 hours.
(a) $I^c$ is current during charging mode.
(b) $Q^c$ is coulombs in chargin mode.
(c) $\%U = \frac{Q^c}{0.96} \times 100$ = percent utilization.
(d) $I^d$ is current during discharging mode.
(e) $Q^d$ is coulombs in discharge mode TABLE II-continued

| Cycle No. | $I^c$, A | $Q^c$, A·hr | %U | $I^d$, A | $Q^d$, A·hr | E,% |
|---|---|---|---|---|---|---|
| (f) | E is cell efficiency | | | | | |

EXAMPLE 3

A comparative test was conducted using the cell of Example 2. In this test the electrolyte, however, did not contain any halogen complexing amino acid salt. The electrolyte merely contained 3 molar $ZnBr_2$ and 0.2 molar $ZnSO_4$. The theoretical capacity of this cell was 0.96 A.hr. The cycling regime and the results thereof are given in Table III below.

TABLE III

| Cycle | $I^c$, A | $Q^c$, A·hr | %U | $I^d$, A | $Q^d$, A·hr | E,% |
|---|---|---|---|---|---|---|
| 2 | 0.2 | 0.77 | 80 | 0.4 | 0.31 | 41 |
| 4 | 0.2 | 0.64 | 67 | 0.4 | 0.20 | 31 |
| 5* | 0.2 | 0.45 | 47 | 0.1 | 0.0 | 0 |
| 6 | 0.2 | 0.86 | 90 | 0.1 | 0.26 | 30 |
| 8 | 0.2 | 0.86 | 90 | 0.1 | 0.30 | 35 |

5*The cell was allowed to stand at open circuit potential between charge and discharge for 15 hours
(a) $I^c$ is current during charging mode
(b) $Q^c$ is coulombs in charging mode
(c) $\%U = \dfrac{Q}{0.96} \times 100 =$ percent utilization
(d) $I^d$ is current during discharging mode
(e) $Q^d$ is coulombs in discharging mode
(f) E is cell efficiency As can be seen in this example, the cell is less efficient than the cell of this invention and is also subject to self discharge.

What is claimed is:

1. In an electrochemical cell having a metal anode wherein the metal is selected from zinc and cadmium; a bromine cathode; an aqueous electrolyte containing a metal bromide, the metal bromide having the same metal as the metal of the anode, the improvement comprising: a bromine complexing agent in said aqueous metal bromide electrolyte, said complexing agent consisting solely of a quaternary ammonium salt of an N-organo substituted alpha amino acid having the following formulas:

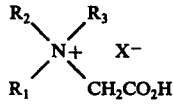
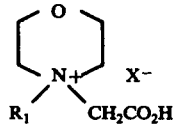
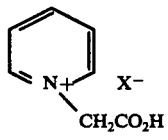
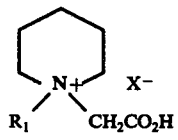

wherein $X^{31}$ is a halide anion selected from the group consisting of chloride and bromide ions, $R_1$, $R_2$, and $R_3$ are alkyl and haloalkyl groups of from 1 to 8 carbon atoms, which quaternary ammonium salt is soluble in water and forms a cathodically active halogen complex which is a substantially water immiscible liquid at temperatures in the range of from about 10° to about 60° C.

2. The cell of claim 1 wherein the anode metal is zinc.
3. The cell of claim 1 wherein the anode metal is cadmium.
4. The cell of claim 1 wherein the halide, X—, is bromide.
5. The cell of claim 1 wherein the quaternary ammonium salt is a nitrogen substituted carboxyethyl derivative of pyridine.
6. The cell of claim 1 wherein the quaternary ammonium salt is a nitrogen substituted carboxyethyl derivative of piperidine.
7. The cell of claim 1 wherein the amino acid salt is a nitrogen substituted carboxyethyl derivative of morpholine.
8. The cell of claim 1 wherein the amino acid is a betaine.
9. An aqueous metal halogen secondary battery including a plurality of electrochemical cells, said electrochemical cells comprising a zinc anode; an inert counter-electrode; an aqueous electrolyte, said aqueous electrolyte consisting essentially of an aqueous zinc bromide solution and a cathodically active bromine complex, which complex is a liquid at temperatures below 60° C and which complex is substantially water immiscible, said bromine complex being formed solely between bromine and a water soluble quaternary ammonium salt of an N-organo substituted alpha amino acid, said salt being selected from those having the following formulas:

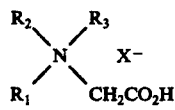
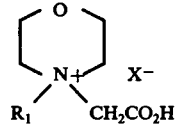
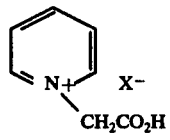
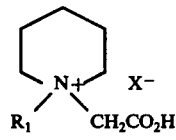

wherein X— is an anion selected from the group consisting of chloride and bromide ions, $R_1$, $R_2$ and $R_3$ are alkyl and haloalkyl groups of from 1 to 8 carbon atoms.

10. An aqueous zinc-bromine cell comprising: a zinc anode; a cathodically active bromine complex; an inert electrode; and an aqueous zinc bromide electrolyte said cathodically active bromine complex being formed solely between bromine and a water soluble quaternary ammonium salt of an N-organo substituted amino acid selected from those having the general formulas:

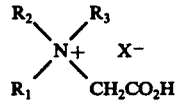
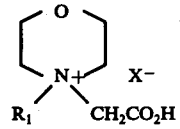
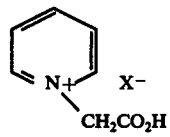
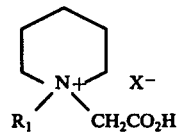

wherein X— is a halide ion selected from the group consisting of chloride and bromide ions, $R_1$, $R_2$ and $R_3$ are alkyl or haloalkyl groups of from 1 to 8 carbon atoms, and wherein said bromine complex of said N-organo substituted amino acid salt is a substantially water immiscible complex which is a liquid at temperatures ranging from about 10° to about 60° C.

* * * * *

UNITED STATES PATENT OFFICE
CERTIFICATE OF CORRECTION

PATENT NO. : 4,064,324

DATED : December 20, 1977

INVENTOR(S) : Daniel J. Eustace

It is certified that error appears in the above-identified patent and that said Letters Patent is hereby corrected as shown below:

Column 7,

In Claim 1, line 57, cancel "$X^{31}$" and substitute therefor -- $X^-$ --.

Column 8,

In Claim 9, lines 25 to 30, cancel

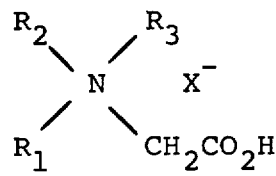

and substitute therefor

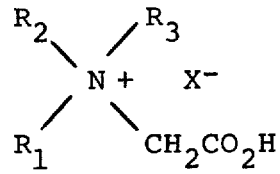

Signed and Sealed this

Twenty-second Day of June, 1993

Attest:

MICHAEL K. KIRK

Attesting Officer

Acting Commissioner of Patents and Trademarks